No. 776,537. PATENTED DEC. 6, 1904.
H. NICHOLSON.
LUBRICATING AXLE.
APPLICATION FILED FEB. 12, 1904.
NO MODEL.
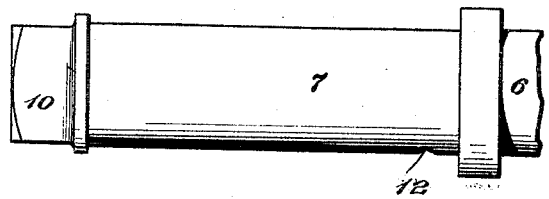
Fig. 1.
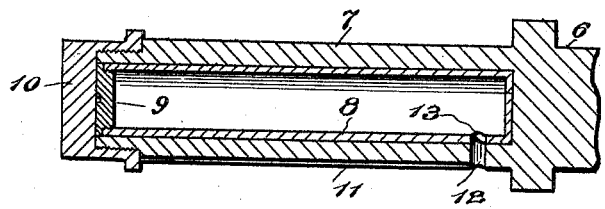
Fig. 2.
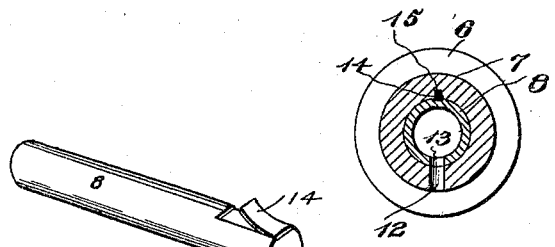
Fig. 3.
Fig. 5.
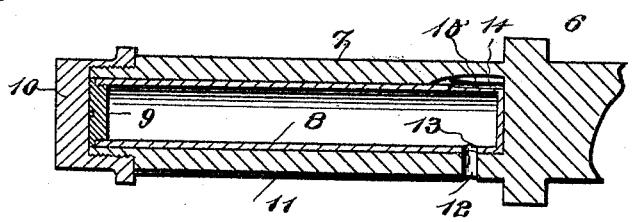
Fig. 4.
WITNESSES:
M. A. Schmidt,
Geo. E. Tew.
INVENTOR
Herbert Nicholson
BY
Milo B. Stevens
ATTORNEYS No. 776,537. Patented December 6, 1904.

UNITED STATES PATENT OFFICE.

HERBERT NICHOLSON, OF CHICAGO, ILLINOIS.

LUBRICATING-AXLE.

SPECIFICATION forming part of Letters Patent No. 776,537, dated December 6, 1904.

Application filed February 12, 1904. Serial No. 193,300. (No model.)

*To all whom it may concern:*

Be it known that I, HERBERT NICHOLSON, a citizen of the United States, residing at Chicago, in the county of Cook and State of Illinois, have invented new and useful Improvements in Lubricating-Axles, of which the following is a specification.

This invention relates particularly to lubricating-axles, and is designed to provide a simple and improved means whereby oil may be stored in a hollow axle and fed to the bearing as needed.

The invention comprises a hollow axle and a cylindrical oil vessel which is fitted in the hollow of the axle and which has a hole which may be brought to register with a hole through the axle-spindle, so as to supply oil to the outside of the latter as needed.

The device is illustrated in the accompanying drawings, in which—

Figure 1 is a plan of the axle-spindle. Fig. 2 is a longitudinal section thereof. Figs. 3 and 4 are respectively cross and longitudinal sections of a modification. Fig. 5 is a perspective view of the oil vessel removed from spindle.

Referring specifically to the drawings, the axle is indicated at 6 and its hollow spindle at 7. A cylindrical oil vessel or cartridge is indicated at 8, and this fits within the hollow of the spindle. It is closed at the end by a removable screw-cap 9, and the cylinder is of sufficient length to fill the space between the end of the spindle and the outer nut 10, which nut holds the cylinder in place. The exterior of the spindle has an oil-groove 11, at one end of which is a hole 12, which is properly positioned to register with the hole 13 in the oil-cylinder. These holes are made in the under side, so that the oil will flow by gravity as fast as needed.

To renew the supply of oil, the outer nut is taken off and the cylinder drawn from the spindle, filled with oil, and reinserted. This may be done without removing the wheel from the axle. A stock of oil sufficient to last a long time may thus be stored in the spindle.

In the modification shown in Figs. 3 and 4 the oil-cylinder is held in place by a tongue 14 on the cylinder which fits in a groove 15 in the hollow of the axle. When the cylinder is put in place, the fit of the tongue in the groove prevents the cylinder from turning and keeps the hole in the cylinder registered with the hole in the axle.

What I claim as new, and desire to secure by Letters Patent, is—

The combination with a hollow spindle having an oil-hole therethrough, of a hollow removable oil vessel which fits in and fills the hollow of the spindle and has an oil-hole registering with the oil-hole in the spindle, a removable cap on the vessel, to permit refilling thereof, a nut on the end of the spindle, which nut contacts the said cap and prevents endwise movement of the vessel, and means to prevent turning of the vessel with respect to the spindle.

In testimony whereof I have signed my name to this specification in the presence of two subscribing witnesses.

HERBERT NICHOLSON.

Witnesses:
    SIGNA FELTSKOG,
    H. G. BATCHELOR.